United States Patent
Sartori et al.

(10) Patent No.: US 9,769,857 B2
(45) Date of Patent: Sep. 19, 2017

(54) SYSTEM AND METHOD FOR ALLOCATING NETWORK RESOURCES

(75) Inventors: Philippe Sartori, Algonquin, IL (US); Deping Liu, Schaumburg, IL (US); Brian Classon, Palatine, IL (US); Vipul Desai, Palatine, IL (US); Anthony C. K. Soong, Plano, TX (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 389 days.

(21) Appl. No.: 13/406,266

(22) Filed: Feb. 27, 2012

(65) Prior Publication Data
US 2013/0223352 A1     Aug. 29, 2013

(51) Int. Cl.
    *H04W 76/02*     (2009.01)
    *H04W 72/12*     (2009.01)
    *H04W 72/04*     (2009.01)

(52) U.S. Cl.
    CPC ....... *H04W 76/023* (2013.01); *H04W 72/121* (2013.01); *H04W 72/042* (2013.01)

(58) Field of Classification Search
    CPC ............. H04W 72/04; H04W 72/0406; H04W 72/121; H04W 76/023
    See application file for complete search history.

(56) References Cited

U.S. PATENT DOCUMENTS

| | | |
|---|---|---|
| 2009/0103500 A1 | 4/2009 | Malkamaki et al. |
| 2010/0240312 A1 | 9/2010 | Peng et al. |
| 2011/0098043 A1 | 4/2011 | Yu et al. |
| 2011/0164625 A1* | 7/2011 | Fourcand ............. 370/498 |
| 2011/0205928 A1 | 8/2011 | Pelletier et al. |
| 2011/0223953 A1 | 9/2011 | Lee et al. |

(Continued)

FOREIGN PATENT DOCUMENTS

| | | |
|---|---|---|
| CN | 101772199 A | 7/2010 |
| CN | 102088736 A | 6/2011 |

(Continued)

OTHER PUBLICATIONS

International Search Report and Written Opinion of Patent Cooperation Treaty (PCT), International Application No. PCT/US13/26878, Applicant Huawei Technologies Co., Ltd., date of mailing May 21, 2013, 8 pages.

(Continued)

*Primary Examiner* — Joseph Bednash
(74) *Attorney, Agent, or Firm* — Slater Matsil, LLP (57) ABSTRACT

A method for operating a user equipment (UE) in a UE group including at least two UEs includes receiving, from a communications controller, network resources information about an allocation of a first set of network resources to the UE group and a transmission indication, where the transmission indication indicates that the UE is selected to transmit in a second set of network resources that is a subset of the first set of network resources. The method further includes transmitting, to other UEs in the UE group utilizing a direct mobile communications (DMC) link associated with the communications controller, a first message including a control indicator in a first subset of the second set of network resources, the control indicator indicating scheduling information for a second subset of the second set of network resources.

33 Claims, 9 Drawing Sheets

(56) References Cited

U.S. PATENT DOCUMENTS

| | | | |
|---|---|---|---|
| 2011/0255450 A1 | 10/2011 | Wang et al. | |
| 2011/0261729 A1 | 10/2011 | Ahn et al. | |
| 2011/0268006 A1 | 11/2011 | Koskela et al. | |
| 2012/0026963 A1* | 2/2012 | Kim et al. | 370/329 |
| 2012/0087318 A1 | 4/2012 | Liu et al. | |
| 2012/0093098 A1* | 4/2012 | Charbit | H04W 72/04 370/329 |
| 2012/0106517 A1* | 5/2012 | Charbit | H04W 72/04 370/336 |
| 2016/0174278 A1 | 6/2016 | Gao et al. | |

FOREIGN PATENT DOCUMENTS

| | | | |
|---|---|---|---|
| CN | 103190189 A | 7/2013 | |
| CN | 103460780 A | 12/2013 | |
| WO | WO-2010/082084 * | 1/2009 | H04W 72/04 |
| WO | WO-2010/049801 * | 10/2009 | H04W 72/04 |
| WO | WO 2010-049801 A1 | 5/2010 | |
| WO | 2010082084 A1 | 7/2010 | |
| WO | 2010109303 A2 | 9/2010 | |
| WO | 2010139847 A1 | 12/2010 | |

OTHER PUBLICATIONS

International Search Report and Written Opinion of Patent Cooperation Treaty (PCT), International Application No. PCT/US2013/027374, Applicant Futurewei Technologies, Inc., date of mailing Apr. 25, 2013, 10 pages.

International Search Report and Written Opinion of Patent Cooperation Treaty (PCT), International Application No. PCT/US2013/027437, Applicant Huawei Technologies Co., Ltd., date of mailing Apr. 25, 2013, 13 pages.

International Search Report and Written Opinion of Patent Cooperation Treaty (PCT), International Application No. PCT/CN2013/071550, Applicant Huawei Technologies Co., Ltd., date of mailing May 16, 2013, 10 pages.

Corson, M. S., et al., "Toward Proximity-Aware Internetworking," IEEE Wireless Communications, Dec. 2010, pp. 26-33.

Lee, J., et al., "MIMO Technologies in 3GPP LTE and LTE-Advanced," EURASIP Journal on Wireless Communications and Networking, 2009, 10 pages, vol. 2009, Article ID 302092.

Qualcomm, "FlashLinq: Enabling Autonomous Proximal Communications", Corporate R&D, Qualcomm Proprietary and Confidential, May 2011, pp. 1-43.

Wu, X., et al., "FlashLinQ: A Synchronous Distributed Scheduler for Peer-to-Peer Ad Hoc Networks", Forth-Eighth Annual Allerton Conference, Allerton-House, UIUC, Illinois, USA, Sep. 29-Oct. 1, 2010, pp. 514-521, IEEE.

Zhang, L., et al., "HARQ Feedback for Carrier Aggregation in LTE-A TDD," 2011, 6 pages, 202.194.20.8, ICC2011/DATA/03-057-11.PDF.

"3$^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.2.0, Jun. 2011, 54 pages.

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.2.0, Jun. 2011, 294 pages.

Extended European Search Report received in European Application No. 13754855.8 dated Dec. 4, 2014, 9 pages.

\* cited by examiner

SYSTEM AND METHOD FOR ALLOCATING NETWORK RESOURCES

TECHNICAL FIELD

The present invention relates generally to digital communications, and more particularly to a system and method for allocating network resources.

BACKGROUND

In the field of wireless communication, there has been increasing demand for direct device-to-device communication (D2D), direct mobile communication (DMC), and the like. This form of communications refers to a communications mode between two or more user equipment (UE) that does not include or does not always include a communications controller in a communication path between or among the UEs. DMC will be used herein to denote this form of communication. Generally, DMC communications involve direct communications between multiple DMC devices (the DMC devices are also commonly referred to as User Equipments (UE), mobile stations, mobiles, communications devices, subscribers, terminals, and the like) occurring as point-to-point (PTP) communications without having the communications passing through and being fully controlled by a communications controller, such as an evolved NodeB (eNB), a NodeB, a base station, a controller, a communications controller, and the like.

Figure 1A:
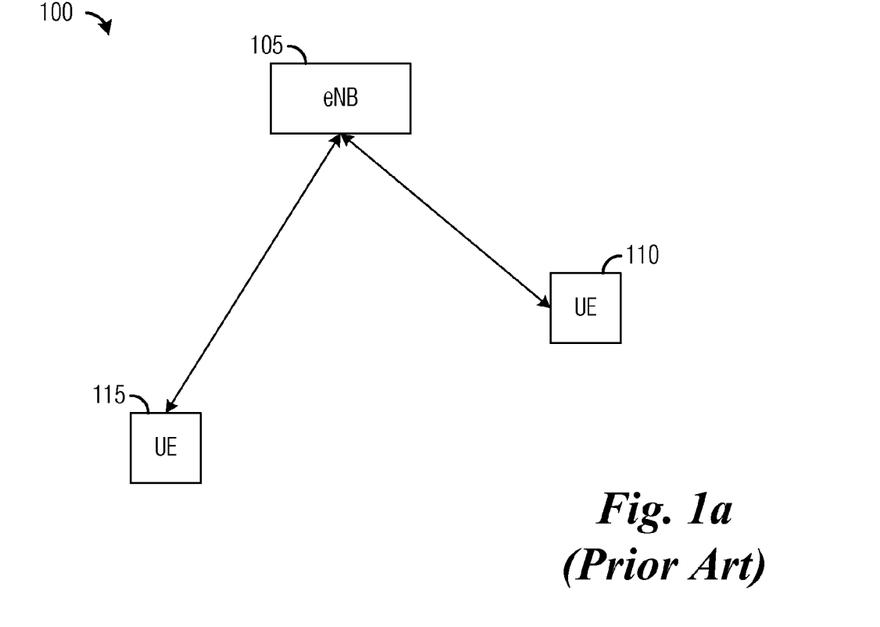
FIG. 1a illustrates an example prior art communications system.

FIG. 1a illustrates a prior art communications system 100, wherein UE, such as UE 110 and UE 115 are communicating with an eNB 105. Communications that are controlled by a communications controller, such as eNB 105, may be generally referred to as cellular communications. It is noted that while only two UEs are represented in FIG. 1a, in practice, there may be more than two UEs communicating with each other. As an example, multiple UEs would be communicating with each other if a multicast group is set up.

Figure 1B:
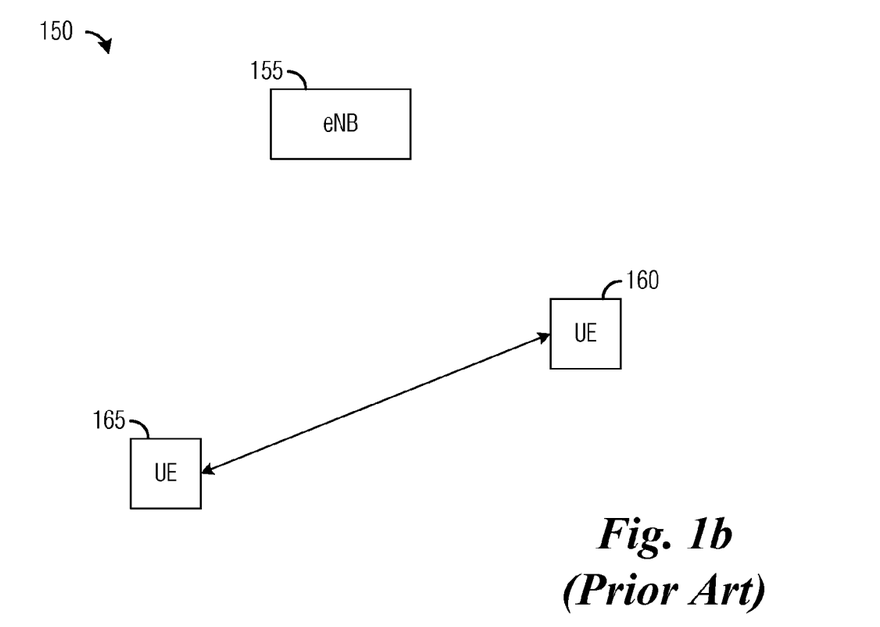
FIG. 1*b* illustrates an example prior art communications system, wherein UEs are communicating using DMC communications.

FIG. 1b illustrates a prior art communications system 150, wherein UE 160 and UE 165 are communicating using DMC communications. As shown in FIG. 1b, communications system 150 includes an eNB 155, but with UE 160 and UE 165 using DMC communications, their communications are directly exchanged without interaction with eNB 155.

SUMMARY OF THE INVENTION

Example embodiments of the present invention which provide a system and method for allocating network resources.

In accordance with an example embodiment of the present invention, a method for operating a user equipment (UE) in a UE group including at least two UEs is provided. The method includes receiving, from a communications controller, network resources information about an allocation of a first set of network resources to the UE group and a transmission indication, where the transmission indication indicates that the UE is selected to transmit in a second set of network resources that is a subset of the first set of network resources. The method further includes transmitting, to other UEs in the UE group using a direct mobile communications (DMC) link associated with the communications controller, a first message including a control indicator in a first subset of the second set of network resources, the control indicator indicating scheduling information for a second subset of the second set of network resources.

In accordance with another example embodiment of the present invention, a method for operating a communications controller is provided. The method includes allocating a set of network resources to a user equipment (UE) group for use by UEs in the UE group for intra-UE group communications over a direct mobile communications (DMC) link. The method also includes transmitting a message including network resources information about the allocation of the set of network resources to the UEs in the UE group, and transmitting, to a transmitting UE in the UE group, a transmission indication indicating that the transmitting UE is selected to transmit to other UEs in the UE group using a subset of the set of network resources.

In accordance with another example embodiment of the present invention, a user equipment (UE) is provided. The UE includes a receiver, and a transmitter operatively coupled to the receiver. The receiver receives, from a communications controller, network resources information about an allocation of a first set of network resources to a UE group and a transmission indication, where the transmission indication indicates that the UE is selected to transmit in a second set of network resources that is a subset of the first set of network resources, wherein the UE group includes at least two UEs. The transmitter transmits, to other UEs in the UE group using a direct mobile communications (DMC) link associated with the communications controller, a first message including a control indicator in a first subset of the second set of network resources, the control indicator indicating scheduling information for a second subset of the second set of network resources.

In accordance with another example embodiment of the present invention, a communications controller is provided. The communications controller includes a processor, and a transmitter operatively coupled to the processor. The processor allocates a set of network resources to a user equipment (UE) group for use by UEs in the UE group for intra-UE group communications over a direct mobile communications (DMC) link. The transmitter transmits a message including network resources information about the allocation of the set of network resources to the UEs in the UE group, and transmits, to a transmitting UE in the UE group, a transmission indication indicating that the transmitting UE is selected to transmit to other UEs in the UE group using a subset of the set of network resources.

One advantage of an embodiment is that a multi-level resource allocation technique is presented. The multi-level resource allocation allows for a coarse resource allocation at a network level, thereby not requiring a significant amount of signaling overhead. While a fine resource allocation is performed at a device-to-device level where signaling overhead does not significantly impact general communications system performance.

A further advantage of an embodiment is that a differential transmission control information technique is presented. The use of differential transmission control information allows for a further reduction in signaling overhead, allowing for greater communications performance.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to network centric resource allocation for DMC communications. For example, a serving communications controller makes a resource allocation to DMC devices and signals the resource allocation to the DMC devices. The resource allocation is signaled using higher layer signaling or a control channel. Herein, a control channel comprises a physical downlink control channel (PDCCH), an enhanced physical downlink control channel (ePDCCH), a physical broadcast channel (PBCH), and the like. Further control information is then provided by the DMC devices as needed. The use of multi-level control information helps to reduce signaling overhead at the network layer, which negatively impacts overall communications system performance.

The present invention will be described with respect to example embodiments in a specific context, namely a communications system that supports cellular communications as well as DMC communications. The invention may be applied to communications systems that are compliant to technical standards, such as Third Generation Partnership Project (3GPP) Long Term Evolution (LTE), WiMAX, IEEE 802.16m, IEEE 802.11x, and the like, as well as non-standards compliant communications systems.

Figure 2A:
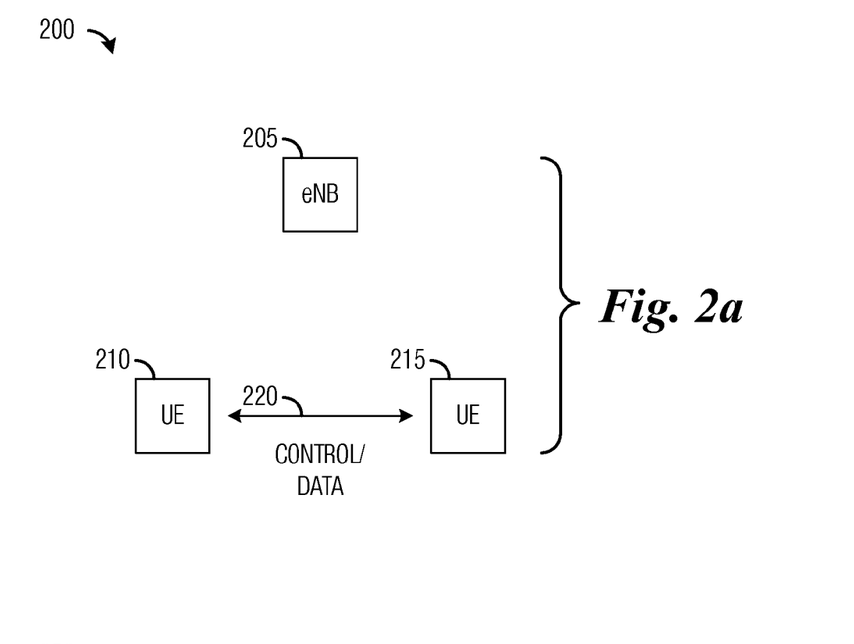
FIG. 2*a* illustrates an example communications system where UEs initiate DMC links according to example embodiments described herein.

FIG. 2*a* illustrates a communications system 200 where UEs initiate DMC links. Communications system 200 includes an eNB 205 and UEs, such as UE 210 and UE 215. While it is understood that communications systems may employ multiple eNBs capable of communicating with a number of UEs, only one eNB and two UEs are illustrated for simplicity.

In a situation where UEs initiate DMC links, control information is exchanged between the UEs to establish a DMC link and the data is subsequently exchanged between UEs once the DMC link is established. UE initiation of DMC links is commonly referred as device centric DMC operation. As shown in FIG. 2*a*, UE 210 and UE 215 exchange control information to establish a DMC link 220, which is later used to allow UE 210 and UE 215 to share data.

Figure 2B:
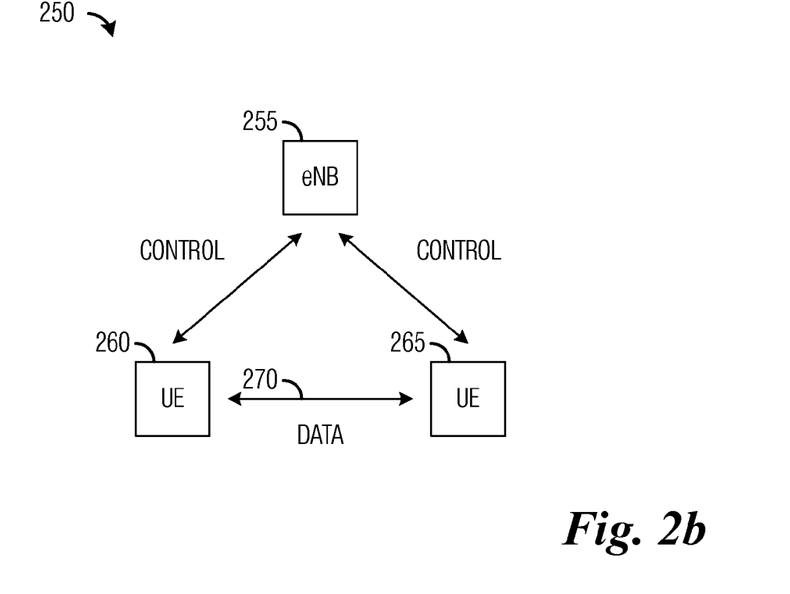
FIG. 2*b* illustrates an example communications system where communications controllers initiate DMC links according to example embodiments described herein.

FIG. 2*b* illustrates a communications system 250 where communications controllers initiate DMC links. A DMC link may comprise a transmission from one UE to one or more UEs, with the data transmission directly occurring within the UEs. In other words, the data communication of a DMC link does not transit through the eNB, relay, or any other infrastructure node. In general, a DMC link is a point-to-point link, which may be between two UEs (a point-to-single-point link), or between more than two UEs (a point-to-multipoint link). Communications system 250 includes an eNB 255 and UEs, such as UE 260 and UE 265. In a situation where an eNB establishes DMC links and manages the DMC links afterwards, the eNB exchanges control information with the UEs to establish a DMC link and then, the UEs exchange data with each other under the control of eNB once the DMC link is established. eNB initiation and management of DMC links is commonly referred to as network centric DMC operation. As shown in FIG. 2*b*, eNB 255 exchanges control information with UE 260 and UE 265 to establish a DMC link 270, which is later used to allow UE 260 and UE 265 to share data. It is noted that the control information exchanged between the UEs and the eNB may include information other than for initiating the DMC link, such as traffic demand, buffer status, battery status, and the like.

Although FIG. 2*b* illustrates a situation wherein an eNB initiates the establishment of DMC links, other network entities in the communications system can also initiate the DMC links, such as a Mobility Management Entity (MME), an eNB, a Base Station Controller (BSC), an Operation and Management server (OAM), and the like.

Although communications system 200 and communications system 250 are shown with only DMC links, in general, a communications system can support different types of communications. As an example, communications systems 200 and 250 can support cellular communications as well as DMC communications.

In general, DMC network entry is different from typical cellular network entry. In order to make DMC transmissions successful, neighbor discovery and DMC link establishment have to be fast and simple. For a network centric DMC operation, having a centralized controller (e.g., an eNB, MME, and the like) to determine the proximity of devices offers the opportunity for having an extremely fast DMC link establishment. The presence of the centralized controller also affords a simple establishment procedure that is potentially seamless for users.

Figure 3:
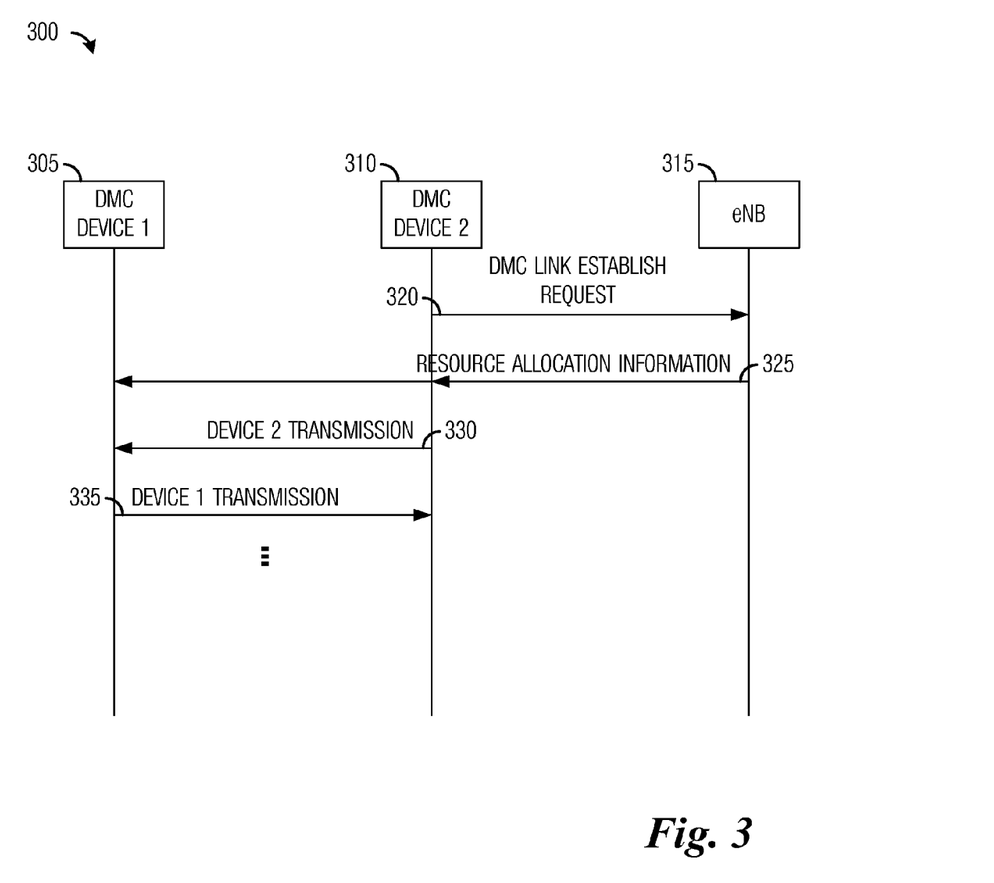
FIG. 3 illustrates an example message exchange in DMC communications utilizing a network centric approach according to example embodiments described herein.

FIG. 3 illustrates an example message exchange 300 in DMC communications utilizing a network centric approach. Alternate approaches may also be used to trigger DMC link establishment. Message exchange 300 involves messages transmitted by DMC devices in a DMC group, for example DMC device 1 305 and DMC device 2 310, and a serving evolved NodeB (eNB) 315. Although the discussion focuses on a DMC group consisting of two DMC devices, a typical DMC group may include any number of DMC devices, such as two, three, four, five, and the like. Therefore, the discussion of a DMC group of two DMC devices should not be construed as being limiting to either the scope or the spirit of the example embodiments.

Message exchange 300 may include one or more of the DMC devices in the DMC group transmitting a DMC link establishment request to the serving eNB. Without loss of generality, in FIG. 3, DMC device 2 310 transmits the DMC link establishment request to eNB 315 (shown as event 320). It is also possible for eNB 315 to receive multiple DMC link establishment requests from members of a DMC group. It is noted that the DMC link establishment request may originate from DMC device 1 305, DMC device 2 310, eNB 315, or a network entity such as a MME, a BSC, an OAM, and the like.

According to the DMC link establishment request, eNB 315 may allocate network resources to a DMC link for the DMC group and transmits information about the allocated network resources to the members of the DMC group. Herein, network resources may include resource element(s) (RE), resource block(s) (RB), subframe(s), slot(s), radio frame(s), and the like. As shown in FIG. 3, eNB 315 transmits information about the allocated network resources to the members of the DMC group (shown as event 325). According to an example embodiment, eNB 315 may send the information about the allocated network resources to the DMC group as a whole. According to an alternative example embodiment, eNB 315 may separately send information about allocated network resources allocated to each member of the DMC group.

Once the members of the DMC group receive the information about the allocated network resources, the members may begin to communicate. As shown in FIG. 3, DMC device 2 310 transmits to DMC device 1 305 (shown as event 330) and DMC device 1 305 transmits to DMC device 2 310 (shown as event 335). It is also possible for eNB 315 to receive multiple DMC link establishment requests from members of a DMC group. It is noted that the DMC link establish request may originate from DMC device 1 305, DMC device 2 310, eNB 315, or a network entity such as the MME, a BSC, an OAM, and the like.

Figure 4:
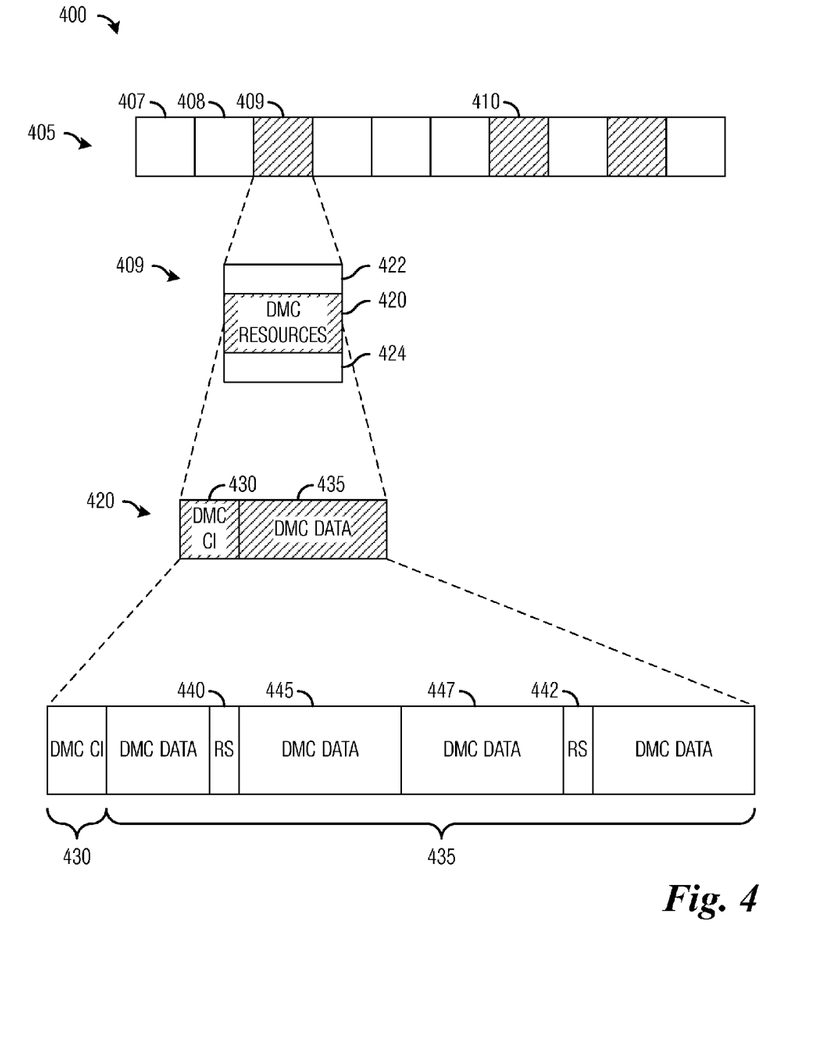
FIG. 4 illustrates an example network resource diagram according to example embodiments described herein.

FIG. 4 illustrates an example network resource diagram 400. Network resource diagram 400 illustrates a sequence of network resources, e.g., a plurality of subframes 405. In plurality of subframes 405, some subframes are allocated for cellular communications, such as subframe 407 and subframe 408, while some subframes (or portions of subframes) are allocated for DMC communications, or can include DMC communication, such as subframe 409 and subframe 410.

Network resource diagram 400 also provides an example detailed view of subframe 409. A portion of frequency resources of subframe 409 may be allocated for DMC communications (shown as portion 420), while other parts of subframe 409 may be allocated for cellular communications (shown as portion 422 and portion 424). It is noted that it is possible for the whole band in subframe 409 is allocated for DMC communications. In such a situation, which is an implementation of carrier aggregation (CA), portion 422 and portion 424 could be network resources on other carrier(s). Although the example presents how to allocate resources for a subframe, it may be possible to allocate resources on slot(s), which comprise subframes, RE(s), RB(s), radio frame(s), and the like. Additionally, although the resource allocation is described for frequency resource allocation, it can be applied to other resource allocations, such as time resource allocation (by allocating subframes, slots, symbols and the like), or code allocation.

Network resource diagram 400 also provides an example view of portion 420. Portion 420, allocated for DMC communications, comprises two parts: a DMC Control Indicator (CI) 430 and a DMC data 435. DMC CI 430 comprises scheduling information (SI) and feedback information (FI). The SI in DMC CI 430 may be used to indicate how network resources in DMC data 435 are used; while the FI may comprises channel quality information and positive acknowledgement (ACK) and/or negative acknowledgements (NACK) of previously received DMC data packets.

Network resource diagram 400 additionally provides an example detailed view of portion 420. According to an example embodiment, an FI portion of DMC CI 430 includes positive acknowledgement (ACK) and negative acknowledgements (NACK) of previously received DMC data packets, while, an SI portion of DMC CI 430 may include:

Source and/or Destination. It is noted that if there are only two DMC devices in the DMC group, the source and/or destination field may not be present and if the transmission timing and reception timing are configured by high layer signaling, this field may not be present either. More generally, given that the number of DMC devices communicating with each other may be small, the source/destination information can generally be coded using a small number of bits (e.g., four bits);

DMC group identifier. In order to make sure that the data transfer is not mistakenly assumed to be for another DMC group when multiple DMC groups are close to each other, each DMC group needs to be uniquely identified by an identifier, e.g., an index, and the identifier needs to be sent in the SI. It is noted that the DMC group identifier may be sent in an implicit manner, such as by coloring the cyclic redundancy check (CRC), or by scrambling the data with a code related to the DMC group identifier;

Hybrid Automatic Repeat Requested (HARQ) process number. It is noted that this field may be optional, if synchronous HARQ is adopted;

New data indicator;

MCS information;

Transmit power information and/or power control commands;

Exact network resource allocation. This field may be optional. As an example, the packet length may be transmitted and the receiving DMC device may assume that the network resources are allocated in a sequential manner in the overall allocated network resources for DMC communications by the serving eNB. Alternatively, packets may be assumed to occupy all of the allocated network resources;

Transmission mode. This field may be optional. Transmission mode may be semi-statically configured. It is noted that it is not necessary to have all transmissions modes supported in 3GPP LTE Release 10; and MIMO information. The MIMO information may include codebook vectors to use, and the like.

A subframe may be partitioned into multiple symbols as shown in FIG. 4, with some symbols used for reference signals (RSs), e.g., RS 440 and RS 442, while other symbols may be used to carry data, e.g., DMC data 445 and DMC data 447. The location and number of RS can be different. It is noted that the reference signals (e.g., RS 440 and RS 442) are not part of DMC data, but are transmitted in DMC resources 420. DMC data 435 may be partitioned to carry data (e.g., DMC data 445 and DMC data 447) and control information (e.g., RS 440 and RS 442). FIG. 4 provides an illustrative example of a partitioning of DMC resources 420 for discussion purposes. DMC CI 430 and DMC data 435 may have alternate mapping, for example, DMC CI 430 may be located adjacent to a RS. It is also noted that these two fields may be located elsewhere, interleaved, on even transmitted on different spatial layer, and the like.

According to an example embodiment, the allocation of network resources to a DMC group may occur in a semi-static manner. The semi-static resource allocation may occur as a multi-level algorithm, with a first level occurring at the serving eNB (or more generally, a serving communications controller) level and a second level occurring in the DMC device level.

FIG. 5 illustrates a flow diagram of operations 500 occurring at a serving eNB as the serving eNB allocates network resources to a DMC device for DMC communications. Operations 500 may be indicative of operations occurring at a serving eNB, such as eNB 255, eNB 315, and the like, as the serving eNB allocates network resources to DMC devices in a DMC group for DMC communications.

Operations 500 may begin with the serving eNB receiving a DMC link establishment request (block 505). The serving eNB may receive multiple DMC link establishment requests involving a single DMC group. According to an example embodiment, a DMC device of a DMC group may explicitly transmit a DMC link establishment request to the serving eNB, requesting that the serving eNB establish a DMC link for the DMC device and other members of the DMC group. According to an alternative example embodiment, the serving eNB may receive the DMC link establishment request from a network entity, such as a MME, requesting the establishment of a DMC link for the DMC group.

The serving eNB may perform a link establishment procedure (block 510). According to an example embodiment, the link establishment procedure determines a viability of the DMC link, for example, based on DMC device proximity, DMC device signal strength measurements, available network resources, positions of non-DMC devices, and the like.

If the eNB, after performing the link establishment procedure, determines that it should establish the DMC link for the DMC group, then the serving eNB may allocate network resources to the DMC link (block 515). According to an example embodiment, information about the allocation of the network resource comprises a list of network resources and which DMC device the network resources are allocated to. The information about the allocation of the network resource further comprises a maximum transmit power. As an example, considering a situation wherein the allocation of network resources comprises three subframes for a DMC group comprising two DMC devices. Then the information about the allocation of the network resources may include a list that specifies that DMC device 1 is allocated to transmit in a first and a third subframe, while DMC device 2 is allocated to transmit in a second subframe, and a maximum transmit power for all or each of the DMC devices. The serving eNB may signal information about the allocated network resources to the DMC devices in the DMC group (block 520). The serving eNB may also signal information about which DMC device in the DMC group is selected to transmit and in which of the allocated network resources. The information about the transmitting DMC device may be signaled along with the allocated network resources or in a separate message.

Figure 5A:
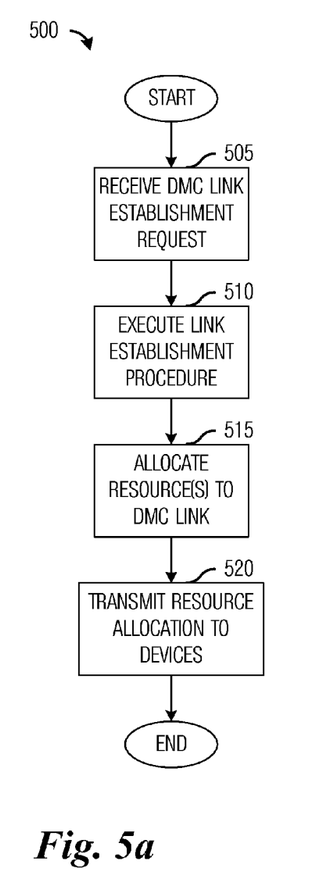
FIG. 5 illustrates an example flow diagram of operations occurring at a serving eNB as the serving eNB allocates network resources to a DMC device for DMC communications according to example embodiments described herein.
Figure 5B:
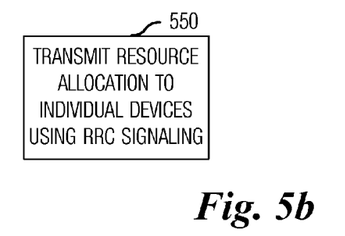

According to an example embodiment, the serving eNB may signal the information about the allocated network resources to the DMC devices in an individual manner utilizing higher layer signaling, such as radio resource control (RRC) signaling (shown as block 550 of FIG. 5b).

Figure 5C:
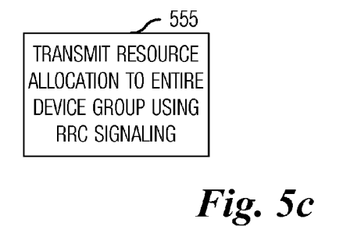

According to an example embodiment, the serving eNB may signal the information about the allocated network resources to the DMC devices to all of the DMC devices in the DMC group utilizing higher layer signaling, such as RRC signaling (shown as block 555 of FIG. 5c). The serving eNB may utilize a multi-cast to signal the information about the allocated network resources to the DMC devices in the DMC group. The DMC group may be identified by a DMC Radio Network Temporary Identities (DMC RNTI), which are similar to C-RNTI or other RNTIs.

Figure 5D:
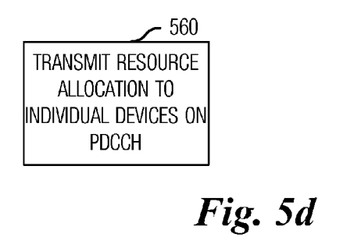

According to an example embodiment, the serving eNB may signal the information about the allocated network resources to the DMC devices in an individual manner utilizing a control channel, such as a PDCCH, ePDCCH, PBCH, and the like (shown as block 560 of FIG. 5d). The serving eNB may send an indication of where the information is signaled in a data portion of a resource block in the control channel, which permits the DMC devices to detect the information. A downlink control information (DCI) format may be used to indicate that the allocated network resources are persistent allocations. An existing format may be modified, or a new format may be created. It is noted that the information signaled using the control channel may not need to have a timestamp.

Figure 5E:
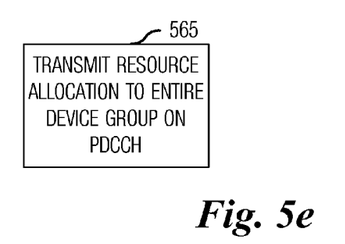

According to an example embodiment, the serving eNB may signal the information about the allocated network resources to the DMC devices to all of the DMC devices in the DMC group utilizing a control channel, such as the PDCCH, ePDCCH, PBCH, and the like (shown as block 565 of FIG. 5e). The serving eNB may send an indication of where the information is signaled in a data portion of a resource block in the control channel, which permits the DMC devices to detect the information. A DCI format may be used to indicate that the allocated network resources are persistent allocations. It is noted that the information signaled using the control channel may not need to have a timestamp.

As an example, if the serving eNB uses RRC signaling to signal the information about the allocated network resources to the DMC devices in the DMC group (either individually (e.g., as shown in FIG. 5b) or collectively (e.g., as shown in FIG. 5c)), the serving eNB may make use of a technique similar to that used in the signaling of semi-persistent scheduling (SPS) to signal the information, as described in Section 5.10 and Section 6.3.1 of 3GPP TS 36.331 Version 10.2.0. Some resources are allocated with given periodicity (e.g., 10 ms is a minimum periodicity) using RRC signaling. It is noted that RRC signaling using the SPS-like format to signal the information about the allocated network resources is to be used only for an initial transmission. Retransmissions are dynamically scheduled using a control channel, such as the PDCCH, ePDCCH, PBCH, and the like.

According to an example embodiment, messages sent to DMC devices (on an individual basis) include a time stamp, such as a frame number, to indicate when the allocated network resources for the DMC link begin to avoid RRC timing ambiguity. According to an alternative example embodiment, the allocated network resources for the DMC link may be assumed to be valid upon receipt (and processing) of the RRC message. There may be a variety of techniques to resolve the timing ambiguity, with the examples presented herein being illustrative examples. However, due to channel variations and HARQ operation designed to handle channel variations, there is no guarantee that all DMC devices will receive the message correctly at the same time.

According to an example embodiment, messages sent to DMC devices (on a group basis) also include a time stamp to indicate when the allocated network resources for the DMC link begin to avoid RRC timing ambiguity.

According to an example embodiment, the messages sent to the DMC devices (either using RRC signaling or the control channel) include the following:

List of time resources on which the DMC communication may take place. A mask may be sent, with a given periodicity. It is noted that a mechanism to allocate time resources for DMC communication is addressed separately (please see co-assigned patent application "System Method for Time Resource Allocation for Device-to-Device Communication Overlaid on a Cellular Network," Ser. No. 13/406,455, which is incorporated herein by reference). Also, it is noted that the existing SPS signaling to indicate which subframes to use may not suitable for DMC communications;

List of the frequency resources on which the DMC communication may take place. It consists in a list of resource blocks (RBs). The existing signaling mechanism in the SPS message could be reused; and Maximum transmit power to use. The maximum transmit power ensures that the DMC group does not interfere with cellular devices.

In general, the serving eNB in its allocation of network resources provides a power budget to DMC devices, and in their additional control information, the DMC devices indicate how to partition the power budget, as an example, by selecting a MCS, a MIMO scheme, a transmit power level, and the like, to use.

Figure 6:
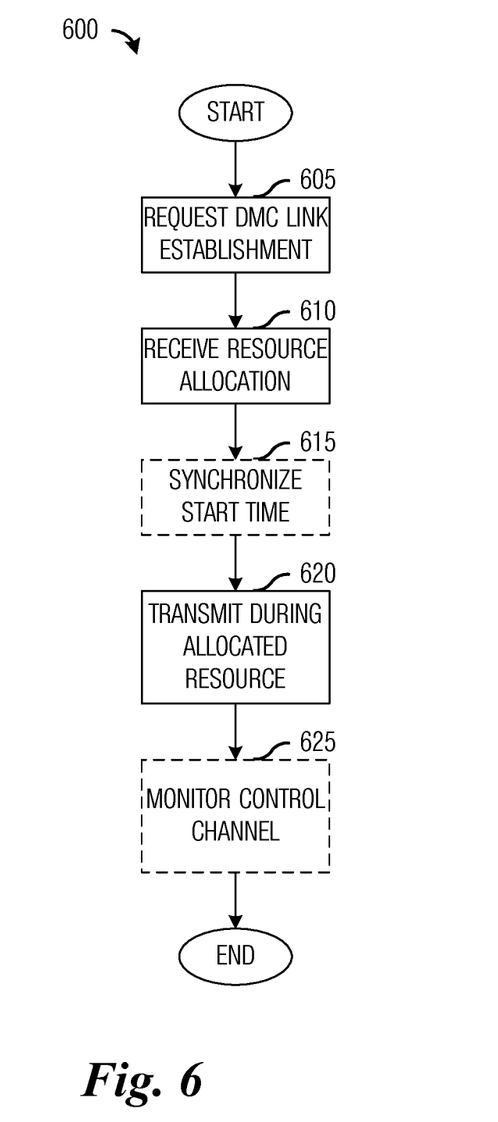
FIG. 6 illustrates an example flow diagram of operations in DMC communications according to example embodiments described herein.

FIG. 6 illustrates a flow diagram of operations 600 in DMC communications. Operations 600 may be indicative of operations occurring in a DMC device, such as DMC device 1 305 or DMC device 2 310, of a DMC group as the DMC device communicates with another DMC device in the DMC group. Although the discussion focuses on a DMC group with two DMC devices, the example embodiments presented herein are operable with DMC groups with any number of DMC devices greater than two.

Operations 600 may begin with the DMC device requesting an establishment of a DMC link (block 605). According to an example embodiment, the DMC device requests the establishment of the DMC link by transmitting a DMC link establishment request to a serving eNB.

The DMC device may then receive a message with information about an allocation of network resources (block 610). According to an example embodiment, the message may be specifically addressed to the DMC device or the message may be addressed to all DMC devices in the DMC group. The message may be in the form of a RRC message or the message may be signaled in a control channel, such as the PDCCH, ePDCCH, PBCH, and the like.

If the message is in the form of a RRC message, then the message may include a time stamp that indicates a synchronization start time when the allocated network resources become valid due to an ambiguity inherent in RRC messages (block 615). Alternatively, the DMC devices in the DMC group may perform a handshaking procedure to synchronize the start time for the DMC link. A description of an example embodiment of the handshaking procedure is provided below.

If the message is signaled in a control channel, then there may be no need for a timestamp or a handshaking procedure since the allocated network resources may be considered as being valid upon receipt of the message. According to an example embodiment, the message may be signaled using the control channel by the serving eNB by including an indication of a search space in a data portion of a RB where the DMC device will be able to find the message in the control channel.

According to an example embodiment, the information about the allocation of network resources includes information about which DMC device(s) in the DMC group is allowed to transmit and in which allocated network resource. The information about the transmitting DMC device(s) may be transmitted in a separate message or along with the information about the allocation of network resources. As an example if a DMC group includes three DMC devices, with a first DMC device being allowed to transmit first, followed by a third DMC device, and then the second DMC device, a list of the transmission order for the DMC devices and associated network resources may be sent to all of the DMC devices in the DMC group. According to an alternative embodiment, the information about which DMC device is allowed to transmit is individually signaled to the DMC device that is allowed to transmit. Referencing the example presented above, information regarding the transmission order may be individually signaled to the first DMC device, the third DMC device, and then the second DMC device.

The DMC device may then transmit to other DMC devices in the DMC group according to the allocated network resources (block 620). According to an example embodiment, a transmission by the DMC device occurs in a network resource allocated to the DMC device and includes two parts: a DMC CI part and a DMC data part. The DMC CI part includes feedback information, as well as acknowledgements and control information, such as source and/or destination information, DMC group identifier, HARQ process number, new data indicator, MCS information, transmit power level, power control commands, exact resource allocation, transmission mode, MIMO information, and the like, which provide information on how the DMC data part of the transmission is used.

According to an example embodiment, a differential technique may be used to reduce the size of the DMC CI part of a transmission. As an example, on an initial transmission by a DMC device, the DMC CI part of the transmission may include the full information to be transmitted in the DMC CI part. However, on subsequent transmissions by the DMC device operating with substantially the same parameters, only a difference in the DMC CI part is transmitted. Typically, the difference being a FI (e.g., the acknowledgements and/or the CQI) portion of the DMC CI part.

The DMC device may also optionally monitor a control channel, such as the PDCCH, ePDCCH, PBCH, and the like, in each subframe or in predetermined subframes to detect dynamic network resource allocations, changes to network resource allocations, or to provide an alternative technique for the serving eNB to signal the information about the allocated network resources (block 625). As an example, if the serving eNB modifies an existing network resource allocation, the serving eNB may send information about the modified network resource allocation using either RRC signaling or the control channel. Even if RRC signaling is used, the DMC device needs to decode the control channel (e.g., the PDCCH, ePDCCH, PBCH, and the like) to obtain the RRC signaling. A restriction on which subframes the DMC device needs to monitor the control channel may help to reduce a processing load on the DMC device.

As another example, in addition to the above described semi-static network resource allocation, it may be useful to dynamically allocate network resources to a DMC group. For instance, if a particular subframe happens to be lightly loaded, rather than letting the unused network resources go unoccupied, the serving eNB may decide to allocate the unused network resources to the DMC group. The dynamic assignment may be signaled to the DMC group using the control channel (e.g., the PDCCH, ePDCCH, PBCH, and the like). A simplified signaling format may be used, such as the modified SPS format used in RRC signaling described above. Furthermore, to reduce search space complexity, the signaling may be sent in a common search space (CSS).

Generally, once the network resources have been allocated, there are several ways to release the allocated network resources. According to an example embodiment, a first technique to release the allocated network resources is to include a time duration in the message used to provide the information related to the network resources. If the time duration is used, then the allocated network resources are valid for the time duration. However, the time duration may be too short or too long and additional messages may be needed to signal information about additional allocated network resources or the allocated network resources may be unused.

According to an example embodiment, a second technique is to allocate the network resources for an indefinite period of time and then have the DMC devices send a request to release the allocation of the network resources.

According to an example embodiment, a third technique is to use an event to trigger the release of the allocated network resources. As an example, the serving eNB may send a message to the DMC devices to immediately release the allocation of the network resources.

Additionally, there may be a need to modify an existing allocation of network resources (as an example, a maximum transmit power level needs to be altered to avoid interference). The serving eNB may send a new message to the DMC devices to modify the existing allocation of network resources. Upon receipt of the new message, the existing allocation of the network resources is preempted by information in the new message. The new message may include a timestamp or a handshake procedure is used to synchronize the DMC devices if RRC signaling is used to signal the new message.

Once the DMC device receives the information about the allocated network resources, it knows that it is to operate in a transmit mode during an allocated transmit network resource and to operate in a receive mode during an allocated receive network resource. Then, during the allocated transmit network resource, the DMC device may be configured to periodically send:

1) a handshake probe signal on the allocated transmit network resource until it receives an echo signal (e.g., an acknowledgement signal, which may comprise information about link quality), from the other DMC devices(s) on the allocated transmit network resource during an allocated receive network resource; and 2) an echo signal during an allocated transmit network resource in response to receiving a handshake probe signal.

Furthermore, during allocated receive network resource, the DMC device may be configured to receive:

1) a handshake probe signal from the other DMC device(s) on the allocated receive network resource and to send back an echo signal during an allocated transmit network resource in response to receiving the handshake probe signal; and 2) an echo signal on an allocated receive network resource from the other DMC device(s).

The DMC device may also send back an echo signal on an allocated transmit network resource in response to receiving an echo signal.

The handshaking procedure may complete after a predetermined number of echoes have been received and/or a predetermined number of echoes have been sent. According to an example embodiment, the handshake probe signal and the echo signal are the same signal. According to an alternative example embodiment, the handshake probe signal and the echo signal are different.

Figure 7:
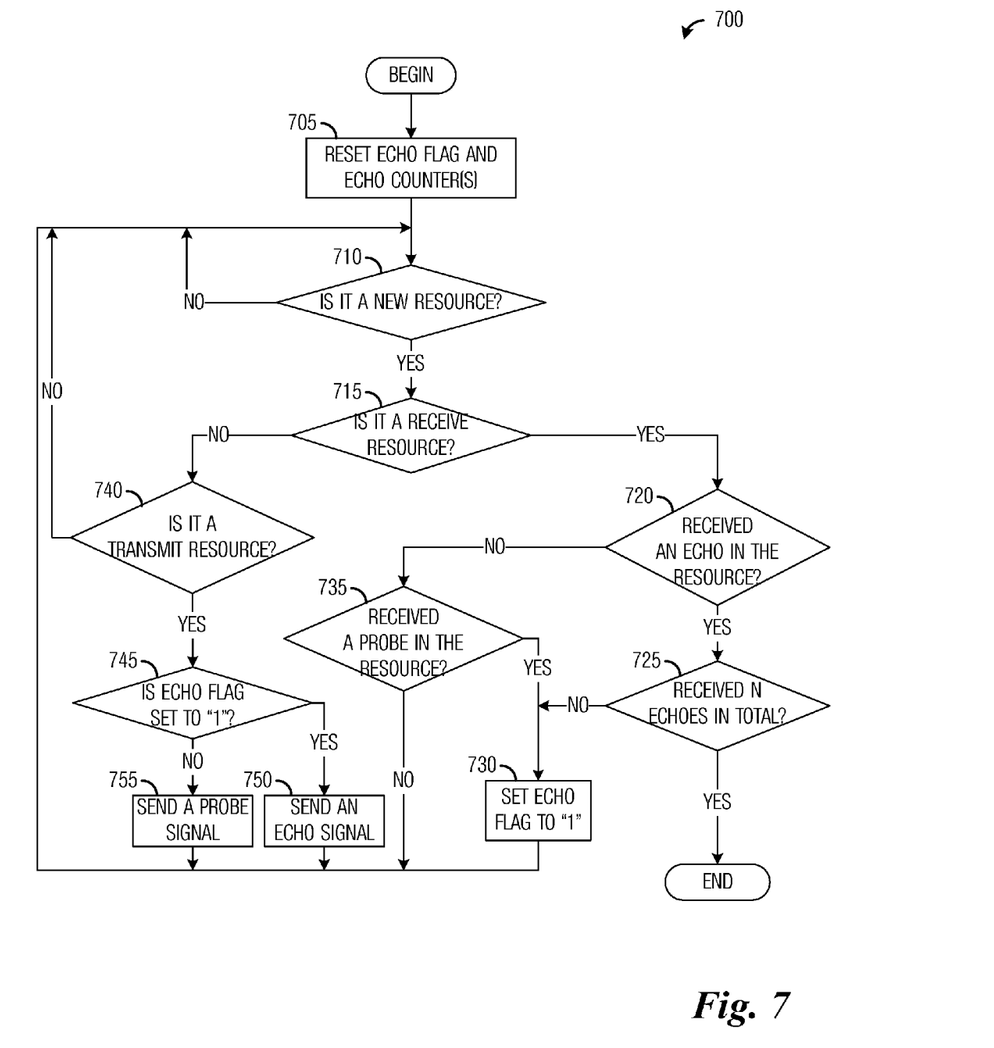
FIG. 7 illustrates an example flow diagram of operations a handshaking procedure performed by DMC devices of a DMC group to synchronize a start time according to example embodiments described herein.

FIG. 7 illustrates a flow diagram of operations 700 a handshaking procedure performed by DMC devices of a DMC group to synchronize a start time. Operations 700 may be indicative of operations occurring in a DMC device, such as DMC device 1 305 or DMC device 2 310, as the DMC devices of a DMC group synchronize a start time for an allocation of network resources.

Operations 700 may begin with the DMC device initializing variables, e.g., resetting an echo flag and an echo counter (block 705). The DMC device may then perform a check to determine if the allocated network resource is a new network resource (block 710). If the allocated network resource is not a new network resource, then the DMC device may wait until the allocated network resource is a new network resource.

If the allocated network resource is a new network resource, then the DMC device may perform a check to determine if the allocated network resource is a receive resource (block 715). If the allocated network resource is a receive resource, then the DMC device may perform a check to determine if it has received an echo in the allocated network resource (block 720). If the DMC device has received an echo in the allocated network resource, then the DMC device may perform a check to determine if it has receive a predetermined number of echoes in total (block 725). If the DMC device has received the predetermined number of echoes, then the start time is synchronized and operations 700 can terminate. If the DMC device has not received the predetermined number of echoes, then the start time is not synchronized and the DMC device sets the echo flag to a predetermined value (block 730) and returns to block 710 to wait for a new allocated network resource.

If the DMC device has not received an echo in the allocated resource, then the DMC device may perform a check to determine if it has received a handshake probe in the allocated resource (block 735). If the DMC device has received a handshake probe in the allocated network resource, then the start time is not synchronized and the DMC device sets the echo flag to a predetermined value (block 730) and returns to block 710 to wait for a new allocated network resource. If the DMC device has not received a handshake probe in the allocated network resource, then the start time is not synchronized and the DMC device returns to block 710 to wait for a new allocated network resource.

If the allocated network resource is not a receive network resource (block 715), then the DMC device may perform a check to determine if the allocated network resource is a transmit network resource (block 740). If the allocated network resource is not a transmit network resource, then the DMC device returns to block 710 to wait for a new allocated network resource. If the allocated network resource is a transmit network resource, then the DMC device performs a check to determine if the echo flag has been set to the predetermined value (block 745). If the echo flag has been set to the predetermined value, then the DMC device sends an echo signal in the allocated network resource (block 750) and the DMC device returns to block 710 to wait for a new allocated network resource. If the echo flag has not been set to the predetermined value, then the DMC device sends a handshake signal in the allocated network resource (block 755) and the DMC device returns to block 710 to wait for a new allocated network resource.

Figure 8:
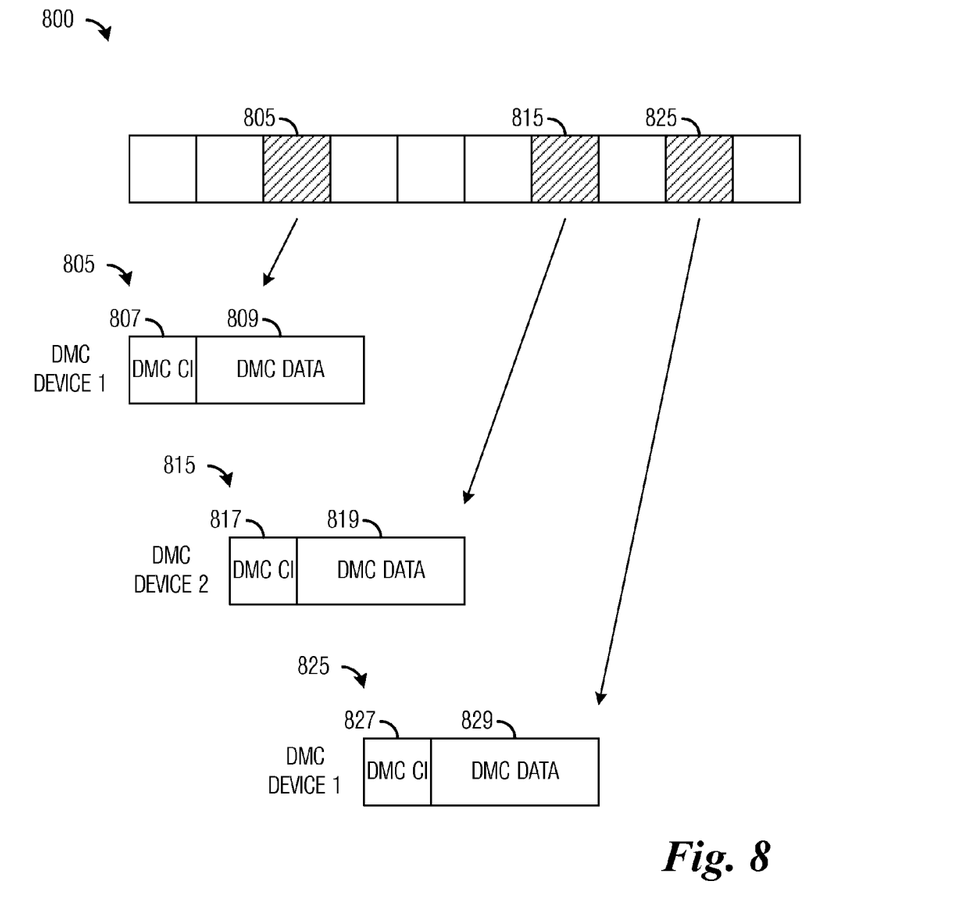
FIG. 8 illustrates an example diagram of example network resources and example DMC transmissions according to example embodiments described herein.

FIG. 8 illustrates a diagram of example network resources 800 and example DMC transmissions. Network resources 800 includes a sequence of subframes, some of which are allocated for use in DMC transmissions, such as subframe 805, subframe 815, and subframe 825. For discussion purposes, considering a situation wherein a serving eNB allocates subframe 805 for a DMC transmission by DMC device 1, subframe 815 for a DMC transmission by DMC device 2, and subframe 825 for a DMC transmission by DMC device 1.

Since the DMC transmission in subframe 805 is an initial transmission by DMC device 1, DMC CI part 807 includes full feedback information and scheduling information, while DMC data part 809 is used to transmit DMC data. Similarly, the DMC transmission in subframe 815 is an initial transmission by DMC device 2 and therefore, DMC CI part 817 includes full feedback information and scheduling information (including an acknowledgement (or negative acknowledgement) corresponding to the DMC transmission in subframe 805), while DMC data part 819 is used to transmit DMC data.

However, the DMC transmission in subframe 825 is a subsequent DMC transmission for DMC device 1. Therefore, DMC CI part 827 may not need to include full feedback information and scheduling information. According to an example embodiment, DMC CI part 827 may include as little as an acknowledgement (or negative acknowledgement) corresponding to the DMC transmission in subframe 815. DMC CI part 827 may also include scheduling information that has changed since the scheduling information was transmitted in DMC CI part 807. DMC data part 829 is used to transmit DMC data.

Figure 9:
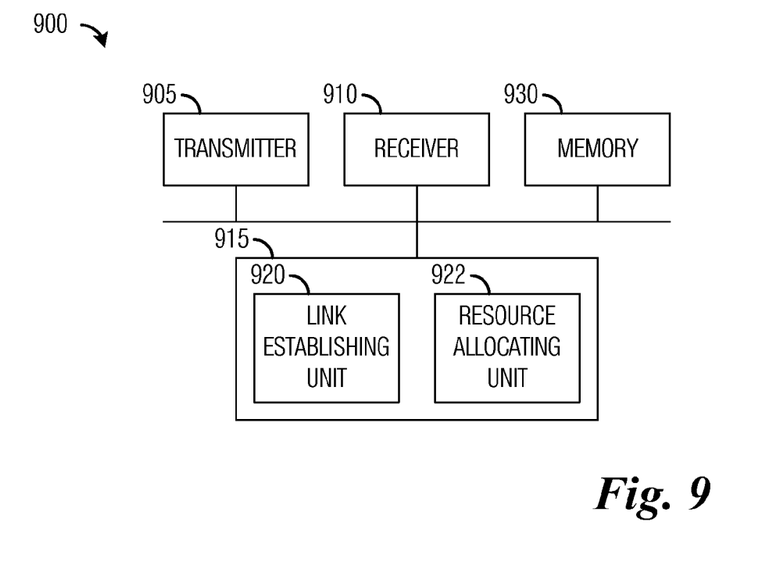
FIG. 9 illustrates an example first communications device according to example embodiments described herein.

FIG. 9 illustrates a first communications device 900. Communications device 900 may be used to implement various ones of the embodiments discussed herein. As an example, communications device 900 may be used to implement an eNB, such as a serving eNB. As shown in FIG. 9, a transmitter 905 is configured to transmit information. A receiver 910 is configured to receive information. Transmitter 905 and receiver 910 may have a wireless interface, a wireline interface, or a combination thereof.

A link establishing unit 920 is configured to process a request to establish a DMC link for a DMC group, as well as execute a link establishing procedure to determine if a DMC link should be established. If the DMC link should be established, link establishing unit 920 initiates the establishment of the DMC link. A resource allocating unit 922 is configured to allocate network resources for DMC devices in the DMC group. Resource allocating unit 922 is configured to perform an allocation of the network resources wherein network resources are allocated to the DMC devices, but specific usage of the network resource is not determined. Resource allocating unit 922 also generates information about the allocated network resources to send to the DMC devices. A memory 930 is configured to store information about the allocated network resources, link establishing procedure results, DMC group identifying information, and the like. Memory 930 comprises solid-state memory, solid-state disks, hard disks, remote network storage, or a combination thereof.

The elements of communications device 900 may be implemented as specific hardware logic blocks. In an alternative, the elements of communications device 900 may be implemented as software executing in a processor, controller, application specific integrated circuit, or the like. In yet another alternative, the elements of communications device 900 may be implemented as a combination of software and/or hardware.

As an example, receiver 905 and transmitter 910 may be implemented as a specific hardware blocks, while link establishing unit 920, and resource allocating unit 922 may be software modules executing in a processor 915, microprocessor, a custom circuit, or a custom compiled logic array of a field programmable logic array.

Figure 10:
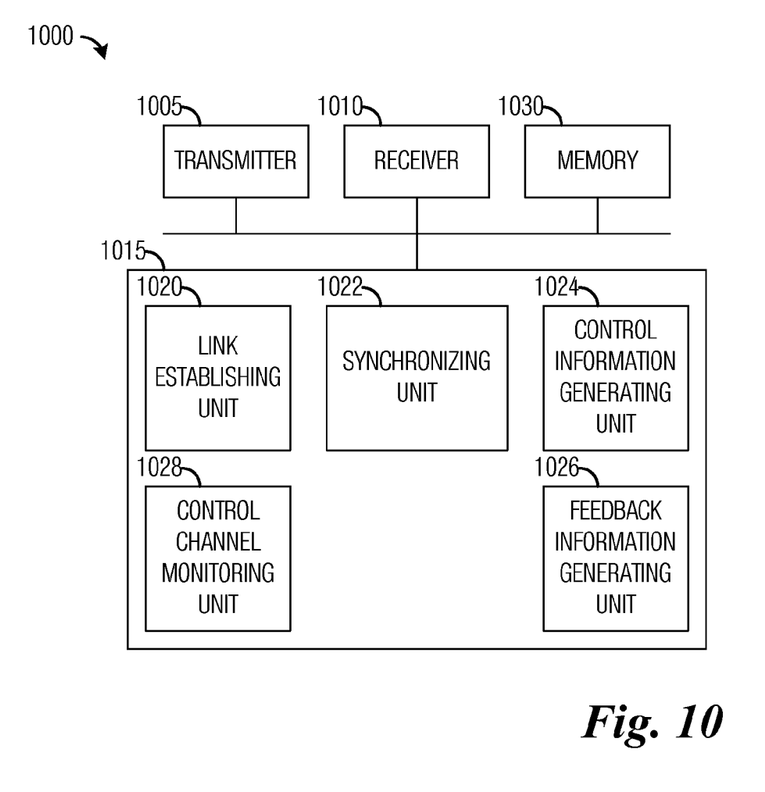
FIG. 10 illustrates an example second communications device according to example embodiments described herein.

FIG. 10 illustrates a second communications device 1000. Communications device 1000 may be used to implement various ones of the embodiments discussed herein. As an example, communications device 1000 may be used to implement DMC device that is part of a DMC group. As shown in FIG. 10, a transmitter 1005 is configured to transmit information. A receiver 1010 is configured to receive information. Transmitter 1005 and receiver 1010 may have a wireless interface, a wireline interface, or a combination thereof.

A link establishing unit 1020 is configured to request the establishment of a DMC link for a DMC link. A synchronizing unit 1022 is configured to synchronize a start time for utilization of the DMC link. Synchronizing unit 1022 makes use of a handshaking procedure, such as described in the discussion of FIG. 7 to synchronize the start time. Alternatively, synchronizing unit 1022 makes use of a time stamp provided in a message providing information about the allocation of network resources for the DMC link to synchronize the start time.

A control information generating unit 1024 is configured to generate control information that specifies a usage of network resources (allocated by a serving eNB, for example) that are used to transmit DMC data. As an example, the control information includes: source and/or destination information, DMC group identifier, HARQ process number, new data indicator, MCS information, transmit power information, exact network resource allocation, transmission mode, MIMO information, and the like. A feedback information generating unit 1026 is configured to generate acknowledgements (positive and/or negative) according to a previously received DMC transmission. Feedback information generating unit 1026 is configured to generate channel quality information (CQI) to indicate a quality of the DMC link.

A control channel monitoring unit 1028 is configured to monitor a control channel, such as a PDCCH, ePDCCH, PBCH, and the like, to detect the signaling of information about the allocation of network resources, information about dynamic network resource allocations, information about modifications to the allocation of network resources, and the like. A memory 1030 is configured to store information about the allocated network resources, DMC group identifying information, feedback information, control information, and the like. Memory 1030 comprises solid-state memory, solid-state disks, hard disks, remote network storage, or a combination thereof.

The elements of communications device 1000 may be implemented as specific hardware logic blocks. In an alternative, the elements of communications device 1000 may be implemented as software executing in a processor, controller, application specific integrated circuit, or the like. In yet another alternative, the elements of communications device 1000 may be implemented as a combination of software and/or hardware.

As an example, receiver 1005 and transmitter 1010 may be implemented as a specific hardware blocks, while link establishing unit 1020, synchronizing unit 1022, control information generating unit 1024, feedback information generating unit 1026, and control channel monitoring unit 1028 may be software modules executing in a processor 1015, microprocessor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a user equipment (UE) in a UE group including at least two UEs, the method comprising:
    receiving, from a communications controller, network resources information about an allocation of a first set of network resources to the UE group and a transmission indication, wherein the transmission indication indicates that the UE is selected to transmit in a second set of network resources that is a subset of the first set of network resources;
    transmitting, by the UE to other UEs in the UE group using a direct mobile communications (DMC) link managed by the communications controller, a first message including a control indicator in a first subset of the second set of network resources, the control indicator indicating resource block allocation information for a second subset of the second set of network resources, wherein the UE is not a designated scheduling master; and
    receiving, over the DMC link by the UE from one other UE in the UE group, a second message including a second control indicator on a first subset of a third set of network resources that is a subset of the first set of network resources, the second control indicator indicating resource block allocation information for a second subset of the third set of network resources.

2. The method of claim 1, wherein the communications controller comprises one or more evolved NodeBs.

3. The method of claim 1, wherein the network resources information is in a third message, and the third message is addressed with a cell radio network temporary identifier of the UE group.

4. The method of claim 1, wherein the second control indicator is received in a time resource that differs from another time resource where the control indicator is transmitted.

5. The method of claim 1, wherein the second control indicator is received in a frequency resource that differs from another frequency resource where the control indicator is transmitted.

6. The method of claim 1, wherein the network resources information is in a third message, and the third message comprises an indication of a maximum transmit power level.

7. The method of claim 1, wherein the control indicator further comprises feedback information.

8. The method of claim 7, wherein the feedback information comprises an acknowledgement of previously received data, an acknowledgement of previously received channel quality information, or a combination thereof.

9. The method of claim 1, wherein the resource block allocation information comprises source information, destination information, UE group identifier, hybrid automatic repeat requested process number, new data indicator, modulation and coding scheme information, transmit power information, exact network resource allocation, transmission mode, multiple input multiple output information, or a combination thereof.

10. The method of claim 1, wherein the network resources information is in a third message, and the third message is received in a radio resource control signaling message.

11. The method of claim 1, wherein the network resources information is in a third message, and the third message is received over a control channel.

12. The method of claim 1, further comprising synchronizing a start time with the other UEs in the UE group.

13. The method of claim 12, wherein the network resources information is in a third message, and the third message includes a time stamp, and wherein synchronizing the start time comprises synchronizing the start time according to the time stamp.

14. The method of claim 12, wherein synchronizing the start time comprises performing a handshaking procedure.

15. The method of claim 1, further comprising sending a request message to the communications controller, to request an allocation of network resources to the UE group.

16. The method of claim 1, further comprising:
    receiving, from the communications controller, a release message to initiate a release of the first set of network resources; and
    releasing the first set of network resources.

17. The method of claim 1, wherein the other UEs are two UEs.

18. A user equipment (UE), in a UE group, comprising:
    a receiver configured to:
        receive, from a communications controller, network resources information about an allocation of a first set of network resources to the UE group and a transmission indication, wherein the transmission indication indicates that the UE is selected to transmit in a second set of network resources that is a subset of the first set of network resources, and
        receive, over a direct mobile communications (DMC) link from one other UE in the UE group, a second message including a second control indicator on a first subset of a third set of network resources that is a subset of the first set of network resources, the second control indicator indicating resource block allocation information for a second subset of the third set of network resources, wherein the UE is not a designated scheduling master; and
    a transmitter operatively coupled to the receiver, the transmitter configured to transmit, to other UEs in the UE group using the DMC link managed by the communications controller, a first message including a control indicator in a first subset of the second set of network resources, the control indicator indicating resource block allocation information for a second subset of the second set of network resources.

19. The UE of claim 18, further comprising a processor operatively coupled to the receiver, the processor configured to generate the resource block allocation information.

20. The UE of claim 19, wherein the processor is configured to generate feedback information.

21. The UE of claim 20, wherein the feedback information comprises an acknowledgement of previously received data, an acknowledgement of previously received channel quality information, or a combination thereof.

22. The UE of claim 18, further comprising a processor operatively coupled to the receiver, the processor configured to synchronize a start time with the other UEs in the UE group.

23. The UE of claim 22, wherein the network resources information is in a third message, and the third message includes a time stamp, and wherein the processor is further configured to synchronize the start time according to the time stamp.

24. The UE of claim 18, wherein the receiver is configured to receive a release message from the communications controller to initiate a release of the first set of network resources, and wherein the UE further comprises a processor operatively coupled to the receiver, the processor configured to release the first set of network resources.

25. The UE of claim 18, wherein the network resources information is in a third message, and the third message is addressed with a cell radio network temporary identifier of the UE group.

26. The UE of claim 18, wherein the receiver is configured to receive the second control indicator in a time resource that differs from another time resource where the control indicator is transmitted.

27. The UE of claim 18, wherein the receiver is configured to receive the second control indicator in a frequency resource that differs from another frequency resource where the control indicator is transmitted.

28. The UE of claim 18, wherein the network resources information is in a third message, and the third message comprises an indication of a maximum transmit power level.

29. The UE of claim 18, wherein the resource block allocation information comprises source information, destination information, UE group identifier, hybrid automatic repeat requested process number, new data indicator, modulation and coding scheme information, transmit power information, exact network resource allocation, transmission mode, multiple input multiple output information, or a combination thereof.

30. The UE of claim 18, wherein the network resources information is in a third message, and the receiver is configured to receive the third message in a radio resource control signaling message.

31. The UE of claim 18, wherein the network resources information is in a third message, and the receiver is configured to receive the third message over a control channel.

32. The UE of claim 18, wherein the transmitter is configured to send a request message to the communications controller to request an allocation of network resources to the UE group.

33. The UE of claim 18, wherein the other UEs are two UEs.

* * * * *